Patented Sept. 9, 1952

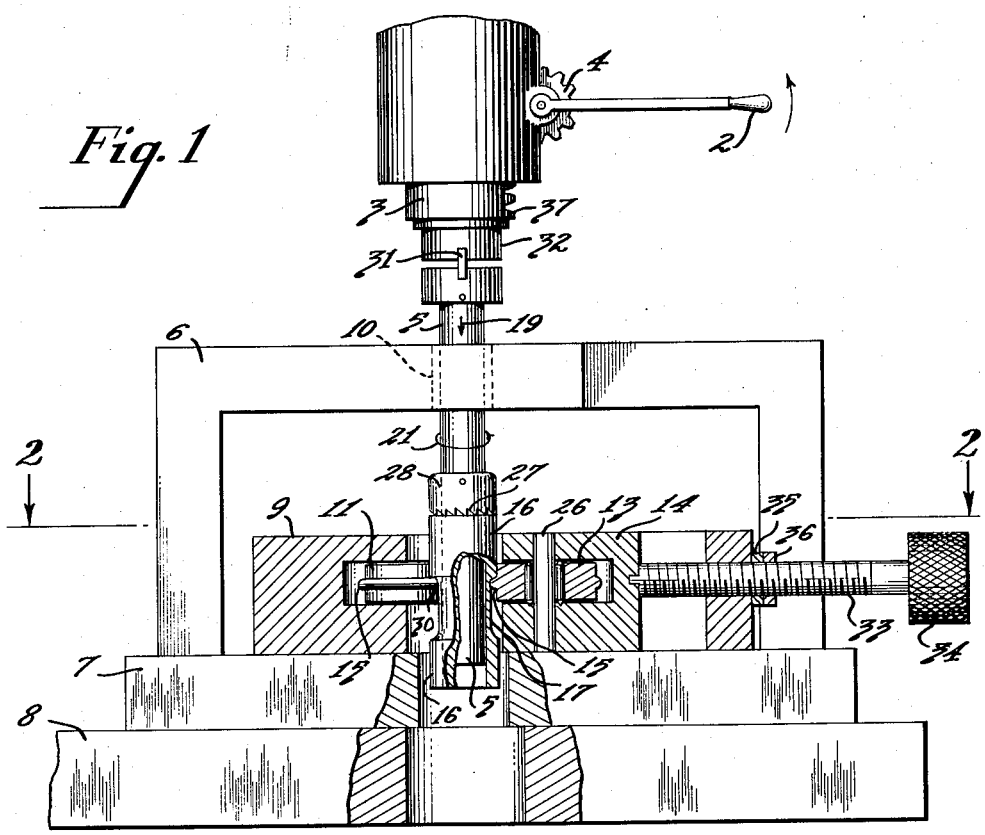

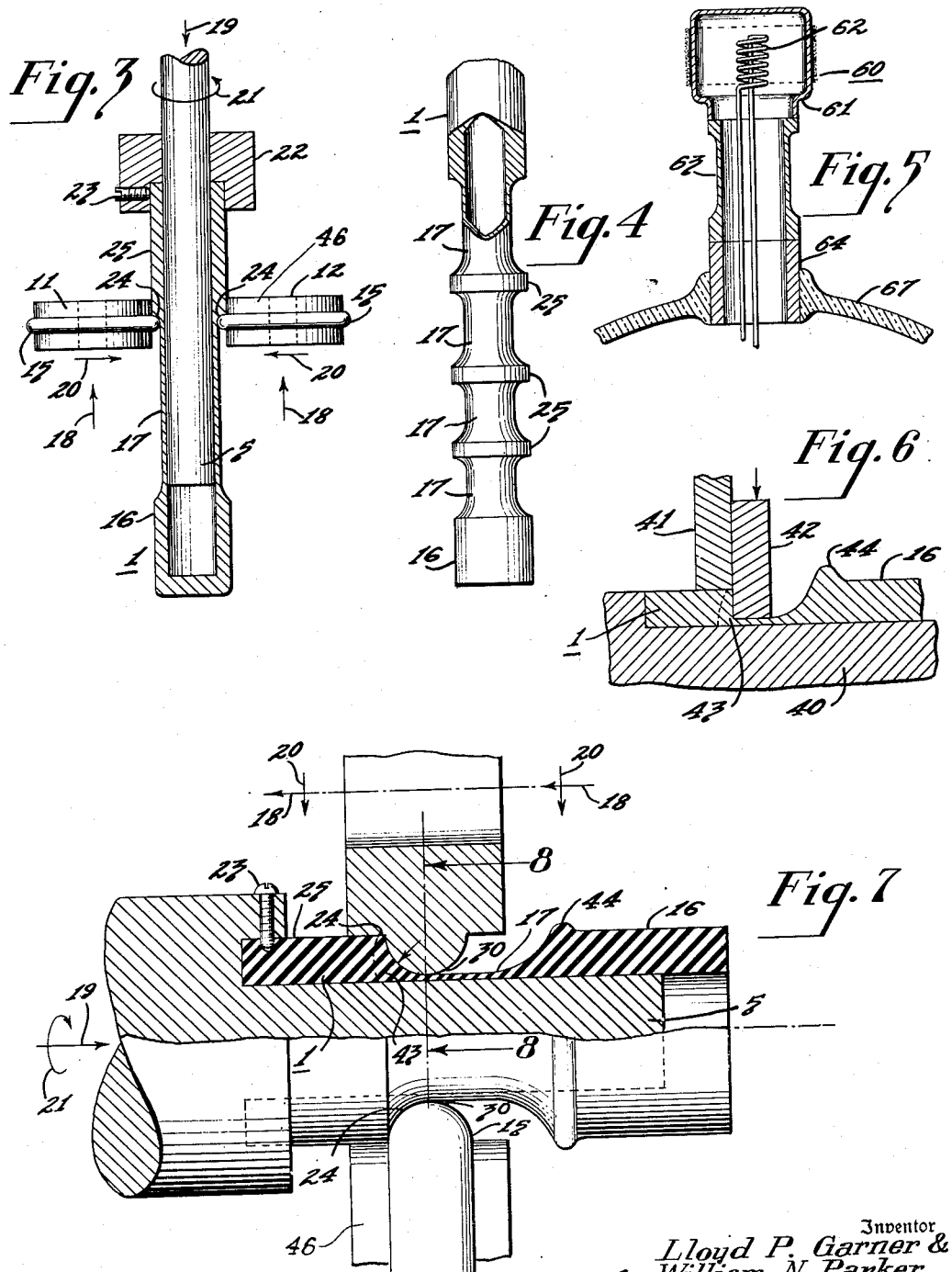

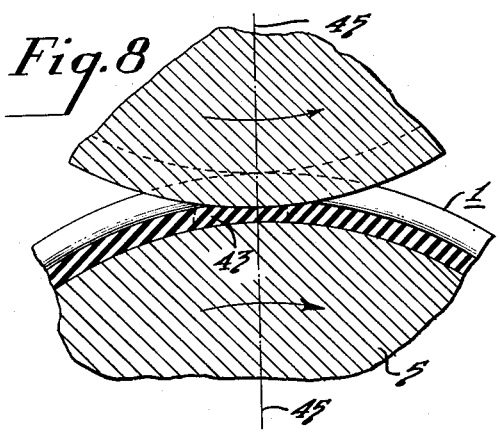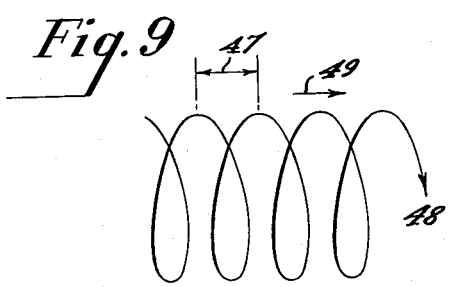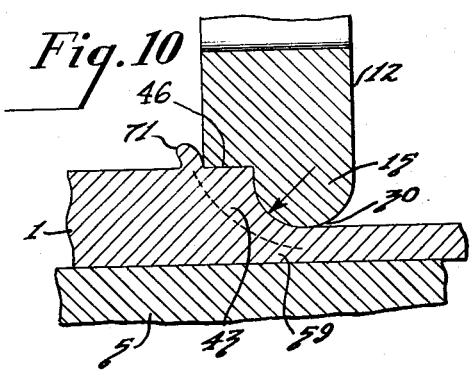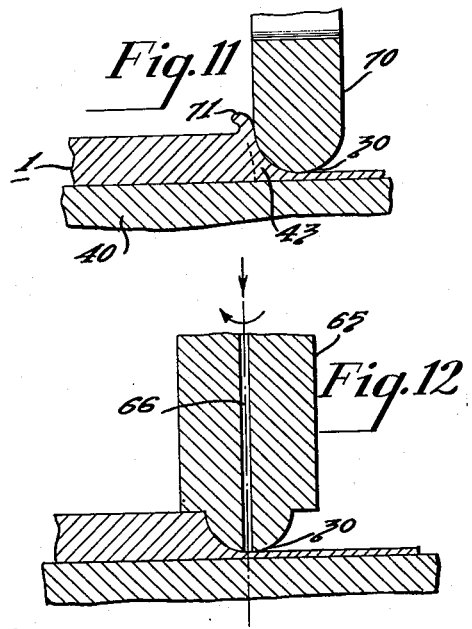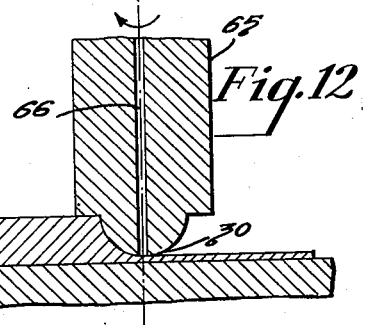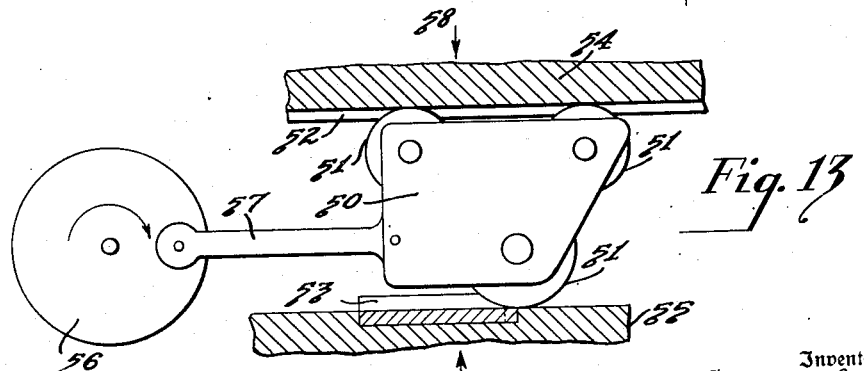

2,610,304

UNITED STATES PATENT OFFICE 2,610,304

THIN-WALLED TUBING FOR USE AS ELECTRODE STRUCTURES OF ELECTRON DISCHARGE DEVICES

Lloyd P. Garner and William N. Parker, Lancaster, Pa., assignors to Radio Corporation of America, a corporation of Delaware Application March 31, 1948, Serial No. 18,114

3 Claims. (Cl. 313—43)

The present invention relates to articles made by a novel method of cold working of ductile materials into a body or geometric shape having a foil-like wall thickness and having a cross-sectional area so thin that present methods of cold-working metals are impractical of application.

Our novel method of cold-working materials is claimed in our divisional application Serial No. 270,095, filed February 5, 1952, and assigned to the same assignee as the present application.

As is well understood by those skilled in the prior art, cold-working of metals takes place at temperatures below the recrystallation temperature of the metal and requires stresses beyond the elastic limit in order to secure the desired permanent plastic deformations. With a common metals the necessary stresses are of considerable magnitude and may be of the order of one hundred thousand pounds per square inch, so that even for parts of relatively small areas enormous total pressures are required if the whole area of the work blank is cold worked simultaneously.

Typical examples of such cold-working processes are axial rolling, extrusion, spinning, and the like. Each of these processes is inherently objectionable when the ductile materials are to be reduced to very thin dimensions by cold-working. In the case of extrusion or axial rolling processes, the pressures required for plastic deformation of the work material are extremely high.

The comparatively small reduction in thickness of the blank in the case of axial rolling accomplished by a single pass of the material through the rolling apparatus is such that a number of passes therethrough is necessary to obtain the desired ultimate thickness. Furthermore, rolling equipment becomes very massive where high pressures are required. In order to avoid the necessity of high pressures the use of small diameter rolls has been resorted to, but to prevent serious bending of the rolls it is necessary to support each of the two working rolls by two auxiliary rollers. These in turn are supported by another group of auxiliary rollers, and so on, until sufficient rigidity is secured. The structure of such a cluster mill requires considerable costly development, and the amount of reduction in thickness per pass through the rolls is limited by the driving torque available. Since all the driving torque must be transmitted through a small diameter roll, the available torque is small. As a result, a great many passes are usually required to produce the thin metal foil required. Since each work pass hardens the material, frequent annealing operations are required, and the whole process becomes tedious, and the results generally unsatisfactory. Also, a rolling mill is unsuited to the forming of parts where only a predetermined portion is to be reduced in thickness.

By extrusion methods commonly used hydraulic pressure is built up simultaneously in the entire volume of metal which is being extruded. Not only must the total applied forces be large, but large strong tools must be used to constrain the metal like a fluid in a cylinder. The result is that aside from using great pressures, which complicates the equipment, prior art methods are thus unsuitable at practicing our method.

In spinning, a moderately thin metal blank is rotated against a round nosed tool or roller which is manipulated to force the metal against a form or mandrel which rotates with the work. Only a slight reduction in thickness takes place each time the tool is passed over the work. The attainment of very thin wall thicknesses by repeated spinning is difficult for two reasons: First, the spinning of the metal causes considerable work hardening so that annealing is required after a relatively small reduction in thickness. Repeated heating and handling of delicate parts is apt to be disastrous. Secondly, as the wall becomes very thin, it can not transmit the forces required by the spinning process and serious buckling and/or fracture results. This is primarily due to the fact that, in reducing wall thickness by spinning, the tool is ordinarily moved toward unworked material and away from the driving force. In this way the thin work hardened metal must transmit the necessary driving forces, which necessarily must be limited by the strength of the thin material.

It will thus be seen that there does not exist in the prior art a suitable method of mechanically accomplishing by cold-working of ductile metals great reductions in wall thickness without the use of large driving forces, massive machinery, and/or frequent annealing, especially when foil-like wall thicknesses are required.

The source of these difficulties is removed by a novel method of cold-working metals and apparatus for carrying out the method. The method may be classed as an extrusion-scanning process, which differentiates basically from conventional extrusion methods of the prior art in that it involves what we choose to call a "scanning" feature, and the design of the apparatus is such as to utilize this feature in greatly reducing the wall thickness of a work blank, which may, for example, comprise a length of tubing the wall of which is greatly reduced by a single pass of the tubing through the apparatus. The tubing itself may be so manipulated in its passage through the extrusion-scanning apparatus as to provide a part or shape, which may be a very thin walled cylindrical tube capable of use as such or further fabricated into an electrode, such as a grid, useful in electron discharge and other devices, which part has greatly enhanced electronic, mechanical, thermal and/or electrical properties and is capable of economical mass production.

An object of the present invention is the provision of an electrode part or other article of manufacture having novel characteristics, both mechanical and electrical, advantageous to the use of said part in an electron discharge and like devices.

Other objects, advantages and results of the invention will manifest themselves from a reading of the following description in connection with the accompanying drawings.

Referring to the accompanying drawings:

Figure 1 is an elevation, partly in section, of one form of apparatus for producing the invention;

Figure 2 is a section taken on lines 2—2 of Figure 1;

Figure 3 is an enlarged cross-section taken through the axis of a cylindrical mandrel and a tubular work piece, showing the wall thinning operation;

Figure 4 is an elevation of an elongated tubular work piece along which the thinning operation has been repeated several times;

Figure 5 is an enlarged sectional view of a cathode structure utilizing one of the thinned end products embodying the invention as a support for the cathode;

Figure 6 is an enlarged fragmentary sectional view illustrating one phase of the operation;

Figure 7 is an enlarged elevation, partly in section, and similar to Figure 3, showing details of processing a work piece;

Figure 8 is an enlarged fragmentary cross-section, on lines 8—8 of Figure 7, showing the extrusion scanning region or volume incompletely bounded in configuration;

Figure 9 is a schematic illustration showing the helical path defined in one form of practicing the process;

Figure 10 is a sectional view showing the flow of the work under excessive back pressure by the working tool having a peripheral head and an adjacent flat surface;

Figure 11 is a view similar to Figure 10, except that the working tool has only a bead in forcible contact with the work;

Figure 12 is a sectional view of another form of the working tool which is provided with a rotatable rounded nose portion; and Figure 13 is a section, partly schematic, of a modified form of apparatus, wherein a reciprocating motion is substituted for a principal rotary motion employed in the apparatus of Figure 1.

The present invention, described in its elemental concepts, is directed to articles made by an extrusion scanning process and apparatus for practicing the same, wherein the wall thickness of a work blank, such as a piece of malleable tubing, is greatly reduced in thickness in a single pass of the blank through the apparatus. This extrusion-scanning process is characterized by the novel features of scanning that portion of the work blank undergoing deformation and having the co-ordinated components or forces involved applied at any instant to a relatively limited geometric volume of the work.

The meaning of the term "scanning" as applied to our extrusion process will be hereinafter defined, as well as certain other terms which we may employ in a somewhat unconventional manner, but the intended meaning will be obvious and fully supported by the description of the invention taken in connection with the drawings.

In one form of practicing our process, a piece of tubing may be placed on a smooth cylindrical mandrel, which provides a hard backing surface, and the sheathed mandrel is passed through a system of rollers. The arrangement, design and manipulation of the rollers comprising this system are adjustable with respect to the work, but the rollers are adapted to be kept at a fixed radial separation from the mandrel which determines the ultimate final thickness of the completed tube. One end of the tube is constrained and fixedly secured to the mandrel and the other end is free to move axially thereof. As the tube is reduced in thickness the heavy or thick walled portion is used to force the thinned wall portion through and beyond the rollers. Means are provided for radially adjusting the rollers relative to the axis of the mandrel and simultaneously applying localized pressure through the rollers perpendicular to each successive portion or region of the tubing being worked in its advance through the roller system. Each roller is provided with a bead of small radius relative to the diameter of the roller. This construction permits relatively small applied total forces to accomplish great reduction in wall thickness of the tubing by virtue of the redistributing and intensifying action of small mutual contact areas between the work part and the roller beads.

As explained hereinafter, an extrusion scanning aperture is formed at each roller as it is brought into contact with the opposing surface of a rotating tubular work blank.

A driving force is applied to the tubing in a direction parallel to the axis of rotation and towards the extrusion aperture. This force provides the axial component required in the execution of our extrusion-scanning process as applied in the present illustration.

By adjusting the rollers, changing the surface of the mandrel, and similar expedients, a variation in the end products may be obtained. For example, by forming depressions in the outer surface of the mandrel and applying a force in a radial direction to the work material, there can be produced a flow of metal into the depressions formed in the mandrel, thus providing thicker longitudinal sections corresponding to the contour of the mandrel depressions. Such a modification is disclosed in co-pending application filed by William N. Parker, Serial Number 84,406, filed March 30, 1949, now Patent No. 2,565,623, issued August 28, 1951, relating to a grid structure and the like. However, in the present application a smooth mandrel is used, and the resulting product may be an electrode element hereinafter described more specifically.

The process herein disclosed contemplates, and the apparatus illustrated for practicing the same provides means for imparting three principal forces to the work through the portion thereof to be worked: one rotating the tube; another moving the tube parallel to the axis of the supporting mandrel; and the third applying pressure perpendicular to the surface of the work.

The process may be said to embody three characteristic or outstanding features: (1) the process is a form of extrusion embodying at least two scanning motions; (2) only a local asymmetrical geometric volume of material is worked at a time; and (3) the extrusion is completed in a single passage of the material undergoing processing. This arrangement avoids objectionable stresses and strains which are encountered in axial rolling, spinning, drawing, and similar metal working operations employed heretofore.

As a preliminary to the disclosure of our invention, the theory and/or technique involved may be explained by again referring to the prior art relating to general extrusion processes commonly practiced and then proceeding to describe in what respect our method differs therefrom. The well-known basic extrusion principle involves placing a piece or quantity of ductile material in some form of a constraining device, so that a piston acting in response to a force, sets up a compression throughout the material sufficient to cause plastic flow thereof through an orifice or die having a contour in cross sectional area substantially identical with that of the desired extruded product. As pointed out above, to extrude the metal, a large hydraulic pressure is created in the entire volume of the metal, with attendant difficulties caused thereby.

To avoid these difficulties, we use a mechanism whereby hydrostatic pressure sufficient for extrusion is limited to a comparatively restricted geometric volume of the material being processed. This difference in principle is possible by producing a scanning effect accomplished by employing an apparatus including a roller system responsive to co-ordinated forces, as more fully described hereinafter. Suffice it to say at this point, that each of the rollers constitutes part of an effective extrusion scanning aperture, and by having one end of the work blank free to move axially of a supporting member, such as a mandrel, the reduced or thinned portion of the work flows freely longitudinally of the mandrel and in the same direction as the motion of the unworked portion of the blank which is moved axially against the rollers by the driving source.

The localization of the working force to a restricted volume while the axial compressional forces are transmitted entirely through the portion to be worked is a distinguishing characteristic of our process over prior art extrusion processes, and makes the application of our extrusion method practical in reducing the wall thickness of the work blank to .001 of an inch or less. Furthermore, the reduction in wall thickness may easily be at least thirty times less than the original wall thickness of the tubing, the reduction being accomplished in a single pass of the blank through the apparatus.

Although the main steps in our extrusion process remain the same, variations in the apparatus for carrying out the process may occur in the production of different end products. The degree of variation in apparatus will depend upon the nature of the end product, and several of such modifications resulting from practicing the basic process herein disclosed constitute the basis for separate applications.

For a more complete understanding of our process it is deemed advisable that certain terms employed by us be presently defined so that the significance thereof will give a better appreciation of our process as the description proceeds.

In referring to our process as an "extrusion scanning" process, we wish it to be understood as connoting a plastic flow produced by progressive local extrusion along a scanning path traversed by an asymmetrical geometric volume of the work blank continuously passing axially through an aperture while said geometric volume is restrained on all sides except that of the aperture, which treatment effects the scanning in a continuous point to point manner along the scanning path through redirecting and intensifying lower actuating component forces which forces are coordinated but capable of independent action, and preferably completing the scanning in a single passage of the work blank through the aperture. It may be noted that the "scanning" takes place in the work undergoing processing as it is subjected to a rotational and/or transverse movement relative between the work material and tool, with the result that the movement of the work is in an orderly path, which path must be resolvable into at least two correlated and mutually perpendicular directional components, for example, longitudinal and transverse, circumferential and radial, or circumferential and axial. In other words the components of the treatment are of two dimensions or directions and become effective in adjacent or continuous sequences.

The term "aperture" as used herein with respect to our extrusion method may be defined generally as constituting an incompletely bounded opening which continuously scans through the work in a regular, smooth, overlapping and non-repeating path. In this respect our extrusion aperture does not have a closed surface contour which may be characterized as a visually identifiable static entity, such as the die aperture used in conventional forms of extrusion wherein the opening or space is bounded by a continuous surface or surfaces sensually perceivable. Rather, it will be appreciated that the term "extrusion aperture" as used herein does not refer to, or identify, a simple coexistent physical entity or bounded surface with obvious shape and dimension, but as constituting a shape determined by the elements which are functionally related to effectively form an extrusion opening through which the extruded portion of the work blank is being forced at any instant during the extrusion process. It may therefore be regarded as consisting of several effective constraining boundaries which include the backing surface or mandrel, a work contacting surface, such as a roller or other tool, and the adjacent portion of the work itself.

In our use of the term "integral" we have in mind particularly a structure composed of one piece of material which may be given various shapes but all of such shapes forming a single body free of joints.

Referring to the drawings, particularly Figures 1 to 3, apparatus for practicing the process may comprise a machine tool similar to a drill press. Since these tools are well konwn, only the parts essential to an understanding of the invention are shown. A rotating shaft 32 is carried by a sleeve 3 which is movable up and down by operation of a handle 2 by means of a gear 4 and a rack 37. A mandrel 5 has closely fitting bearings 10 in a yoke 6 which is in turn attached to a base 7. The base 7 in turn rests on a drill press table 8 which is connected mechanically to the upper part of the press. The base 7 supports the tube reducing device having an auxiliary frame 9 loosely fitting within the yoke 6. The closely fitting bearings 10 and yoke 6 serve to keep the mandrel 5 running true about its axis and substantially perpendicular to the upper surface of the base 7. The frame 9 carries non-adjustable rollers 11 and 12, and adjustable roller 13 mounted in slide block 14 slidable within frame 9 toward and away from rollers 11 and 12 (see Figure 2).

That is to say, the rollers 11 and 12 although rotatable are of a stationary axis type, i. e., non-adjustable relative to each other, being mounted in the outer frame 9, while the roller 13 is mounted on the slide 14, and hence, is adjustable with respect to the other rollers. For the present illustration the rollers 11, 12 and 13 may be 1 inch in diameter with a half round bead or ridge 15 having a radius of .062 inch. This radius is not critical but there is usually an optimum for a given combination of work metal, or thickness, and the amount of reduction desired. A general ratio of bead radius to original wall thickness of work blank may vary between .1 and 10 depending on the original wall thickness, the material and the results desired. It is also to be understood that a wide variety of shapes and/or cross-sections of rollers may be employed.

The auxiliary frame consisting of elements 9, 14, 33, 34, 35, 36 and rollers 11, 12 and 13 is free to slide on the base 7 so as to automatically center the rollers about the work piece or tubing, referred to generally by the numeral 1, and the mandrel 5. While the use of three rollers is preferred on account of the inherent automatic centering feature it is to be understood that any number of rollers may be used in a suitable holding construction.

Certain of the parts just described are shown more clearly in Figure 3 wherein the work part 1, having a thinned wall section 17 and an unworked end section 16 which may be closed at one end, is fitted over the mandrel 5. The end section 16 need not be a part of the tube 1 in order to practice the process in its elemental form, that is, by extrusion scanning, but for purposes of illustration it is shown for reasons that will be obvious hereinafter. The wall thickness of the metal tube 1 is reduced by the simultaneous application of axial pressure along the lines 18 and 19 (see arrows of Figure 3) and radial pressure 20, while the tube is being rotated under the rollers. The mandrel 5 serves to back up the inner surface of the tube 1 in the region opposite the rollers, and to transmit the necessary rotational torque 21 to the work piece through clamping devices which may comprise a collar 22 provided with a set screw 23. The relatively small radius bead 15 on rollers 11, 12 and 13 provides intense local pressure in region 24 of the portion 25 of tube 1 to be worked, causing plastic deformation and consequent thinning down of the thick wall of the tube. The resultant thin pall portion 17 flows freely away from rollers 11, 12 and 13 and along the mandrel 5 with substantially no loss in volume of material. As a result the length of the thin portion 17 will be extended axially in proportion to the reduction in wall thickness. All three rollers 11, 12 and 13 turn on precision needle bearings 26, as shown particularly in Figures 1 and 2. As illustrated in Figure 1, the work part undergoing treatment is a tube blank and it is caused to rotate by a clutch sleeve 28 attached to the mandrel 5 and having teeth 27. In this instance, the mandrel has an outer smooth surface. If the closed end of the section 16 is omitted the resulting product may be used as a cathode support as illustrated in Figures 5 and 7, as hereinafter more fully described.

Universal coupling 31 (Figure 1) transmits to the mandrel 5 both the rotary motion of the shaft 32 and the axial motion of the sleeve 3 and shaft 32 without vibration or eccentricity, so that the mandrel 5 runs true with respect to the rollers 11, 12 and 13. Any other suitable arrangement may be used.

The forming operation combines the advantages of small radius contact surfaces and high unit pressure of the cluster type rolling machine with the principal advantage of an extrusion process in that the necessary forces are transmitted by the relatively heavy unworked wall 25 of the work piece 1. The rollers 11, 12 and 13 are preferably made of hardened steel carefully formed and polished. It has been found that the hardness of the rollers should measure about 64 Rockwell C. while the hardness of the mandrel should measure between 64 to 66 Rockwell C.

With the work piece 1, mandrel 5 and associated parts 28, 31 and 32 all rotating as indicated by the arrow 21 at a speed of about 700 revolutions per minute, feed screw 33 is advanced by means of knurled handle 34. This causes slide 14 and roller 13 to move toward work piece 1 and rollers 11 and 12 and force the heads 15 of rollers 11, 12, and 13 into the work piece a predetermined depth as set by nut 35 and locknut 36. This depth is so chosen as to give the desired wall thickness of thinned down portion 17. Handle 2 is now operated so that the attached gear 4 and associated rack 37 of the drill press exert a downward axial force 19 on work piece 1 through elements 5, 28, 31 and 32; simultaneously the friction between the work piece 1 and the mandrel 5 causes them to be driven in unison and provides driving power for rotating the rollers 11, 12 and 13. Due to the combined action of 18, 19 and 20 and rotary motion 21 forces the thinned wall 17 will lengthen out and the original wall 25 will shorten. After a few seconds a suitable length of thinned wall 17 will have been obtained and the axial force 19 is then removed; the rollers are backed off, the drill press stopped, and the finished work piece 1 removed from mandrel 5. The finished work piece in this instance, as shown in Figure 3, consists of two end sections 16 and 25 of .032 inch wall thickness joined integrally by a section 17 of tubing having a very much thinner wall, all three sections having an inside diameter of .032 inch corresponding substantially to the outside diameter of mandrel 5. With reasonable care to secure concentricity of mandrel 5 and rollers 11, 12 and 13 about the axis of mandrel 5, wall thicknesses of less than .001 inch are readily obtainable. This corresponds to a reduction of over thirty to one in a single pass. In spite of the foil-like nature of the thinned down section, the completed part will be relatively rigid and strong mechanically.

Figure 7 shows more in detail the various steps set forth above in describing our process, but enlarged so as to be more clearly understood. The resulting product is modified to the extent that the enclosing end of the end section 16 has been omitted so that the finished product is an open tube having thick end ferrules joined by a relatively reduced intermediate thin wall portion, but all three portions have the same internal diameter.

The process just described may be better understood by examining in some detail the behavior of the metal in the region of plastic flow during the carrying out of the process.

An elemental form of our local extrusion, with emphasis directed to the feature of applying pressure to a limited volume of work material, is illustrated in Figure 6. In this instance a narrow work blank 1 is supported by a backing member 40 and restrained laterally, except on one side, in a suitable holder 41 so that pressure developed by a punch 42 is localized to substantially the region 43 and that immediately below the punch. As the punch 42 is forced into the work blank 1, the material of the blank flows out from under punch 42 and pushes region 16 away to the right in Fig. 6. It should be noted that this moving away, or elongation of the region 16 takes place much more readily after the punch has progressed an appreciable distance through the wall of the work blank. In fact, when the punch 42 first enters or penetrates the work blank the material of region 16 is momentarily effectively constrained from moving by the tension in the work material located under punch 42, so that a projection or bump 44 is formed, said bump being shown exaggerated for purposes of illustration. As the punch penetrates more deeply into the material, elongation thereof takes place more readily.

From this simple explanation of local extrusion it will be appreciated that the total required force is considerably less than if it were necessary to subject all of the unworked material of a large area blank to the unit pressure required as in the case of conventional extrusion methods.

Applying this elemental principal of local extrusion to the forms of apparatus described heretofore, attention is directed to Figures 7 and 8. The beads 15 of the several rollers 11, 12 and 13 function in the same manner as the punch 42 and exert local pressure upon the small work region 43. As these rollers progress over the work blank 1, due to rotation of the latter, compressive stresses are built up in region 43 which are sufficient to cause plastic flow of the material comprising said region. Because of the thick unworked adjacent portion 25 of the work blank 1, and the axial attachment thereof to the mandrel 5, restraints are provided which limit the flow of material in the plane of rotation. The effectiveness of these restraints is materially assisted by making the radius of the rollers large compared with the radius of the bead 15. Figure 6 shows in an exaggerated form the corresponding operation performed upon work region 43, except that the punch 42 functions in a manner similar to bead 15. It should be noted that the geometrical shape of the region 43 is not symmetrical in any way; neither does it progress or appreciably shift position ahead of behind the line 45 (see Figure 8) joining the roller and mandrel axes. That is to say, this asymmetrical region 43 is not a specific portion of work material, but is actually a geometric volume which progressively moves with the roller through different portions of the work blank during the extrusion operation. Further, the surface of each roller in contact with the work region 43 is one of the components which constitute an incompletely bounded extrusion aperture, which is a feature more fully developed elsewhere herein.

From the above analysis, it will be seen that to local extrusion there has been added the important feature of forces continuously progressing over the work, which progression constitutes a single scanning operation. This results in an intensified pressure in a limited portion of the work blank, which causes plastic flow axially out from under the rollers and along the surface of the mandrel 5. Due to the constraining action of the holder mandrel 5 and the cylindrical portion 46 of each of the rollers 11, 12 and 13, the flow takes place through the extrusion aperture formed between the outer periphery of each of the rollers and the surface of the mandrel. This flowing action results in a thinning down and consequent elongation of the tubular blank. By localizing the extrusion in this way the extruding action does not take place simultaneously around the circumferential periphery of the blank, but rather is restricted to local portions of the periphery as they successively come under each roller. However, because of the rapid rotation of the blank, these local portions are successively and continuously extruding in close sequence, so that effectively the entire periphery is extruding substantially at one time.

As previously stated, the geometrical shape of the region of the blank subjected to extruding pressure is asymmetrical. It was also noted that this asymmetrical region is not a specific portion of the material, but is actually a geometric volume which progressively moves with the roller through different portions of the material of the blank 1. This relatively small geometric volume is constrained and/or subjected to high concentrated and/or redirected forces on all portions of its boundary surface but one, which acts as the exit orifice or aperture 30 through which local extrusion takes place. For the purpose of convenience, the work material may be said to have passed through the extrusion aperture when subsequent scans produce no further working of the particular work volume. In other words, this local asymmetrical geometrical volume and associated extruding aperture may be caused to progressively scan circumferentially and axially through the material of the work blank as contemplated by our process.

As illustrated particularly in Figure 7, this thinning process is accomplished by the outer surface of the blank 1 moving in a rapid principal motion substantially parallel and tangent to surfaces of the rollers and blank (see arrow 21) and simultaneously at a slower rate in a direction parallel to the surface of the blank and perpendicular to this principal motion (see arrow 19). A third force comes into being when the rollers are moved more slowly radially into the work blank 1 by a force (see arrow 20 shown in Figures 3 and 7) which is in addition to and simultaneous with the above motions. It is also possible to combine all three of the above mutually perpendicular motions simultaneously if desired as long as the scanning path of the asymmetrical geometrical volume is a regular non-repeating path through the work blank.

The scanning path generated in Figs. 1–5, 7 and 8 may be said to be essentially helical in form, as shown in Figure 9, with a rather fine pitch 47 due to the relatively high peripheral speed of rotation 48 as compared with the axial speed 49 of advancement of the work. We have found that the pitch should be sufficiently fine as to permit an overlapping of the local portions during adjacent scans. The actual pitch used depends upon the kind and thickness of the blank material, the radius of the rollers, the radius of beads formed thereon, and the thickness and surface finish required. However, the pitch between adjacent sections of the scanning path should not be too great.

The construction illustrated in Figure 13 is a modification of our scanning process as applied to reducing the wall thickness of a blank 53 in the form of a flat sheet of ductile material. The apparatus may comprise a car 50, provided with rollers 51 which run in a groove 52. The groove 52 is formed in a constraining member 54. In the arrangement shown, a rapid reciprocatory motion of the car 50 relative to the blank 53 may be provided by the crank 56 and connecting rod 57, which motion is the equivalent of the rotational motion of Figs. 1–3. The compressive force 58 is at right angles to the reciprocating motion, and may be applied by any external means (not shown). Suitable means, which may be of a conventional form, would be required to slowly move the blank 53 in a third direction parallel to the surface of the blank and perpendicular to both the reciprocating motion and the force 58. The scanning pattern generated by the rapid reciprocating motion and the third motion will be zig-zag, and the pitch thereof need not be constant across the width of the scanned area, i. e., it may be coarse, followed by a relatively fine pitch so as to produce a variable pitch scanning pattern. In any event, the scanning cycles should overlap to produce the proper scanning effect featured by the invention.

From the foregoing it will be understood by those skilled in the art that the plastic flow produced by the passage of the geometric volume of material undergoing scanning at a given time will develop a crystal pattern different from anything produced by conventional extrusion methods; further, this pattern will be characteristic of our scanning extrusion method so that from an examination of microphotographs, especially of the thinner portions of the finished product, it will be possible to identify the process from plastic flow lines or patterns which result from practicing the scanning operation herein disclosed. Therefore, by an examination of the finished product it can be determined whether or not the product was made by practicing our invention, i. e. by extrusion scanning. This flow pattern will naturally be influenced by the kind of ductile material used, but for a given material it will be reasonably regular and capable of identification.

Expressing the above somewhat differently, it may be mentioned that it can be established by reference to microphotographs that a wire which has been drawn, possesses a characteristic fibrous structure developed by the drawing operation. In an analogous manner the crystal pattern developed by our extrusion scanning can be used to establish or identify the processing of a given work piece by extrusion scanning, as opposed to employing a conventional extrusion method. That is to say, our extrusion process develops an identifiable crystal pattern which is characteristic of scanning a localized volume of work at a given time, and by following a continuous path, etc. The identifying characteristics of the crystal pattern developed by our extrusion scanning may be attributed to such factors as the spiral formation characteristic of the scanning operation and apparatus employed, the plastic flow resulting from scanning a localized geometric volume which imparts characteristic flow lines individual to the process, etc. Consequently, we feel entitled to claim a finished article inherently having novel features that may not be obvious from a casual inspection thereof, but nevertheless are only generated by the form of extrusion scanning contemplated herein.

In the present disclosure, we use the term "great reduction" as applied to the resulting wall thickness of the end product, and we use it in the sense that very substantial elongation of the work blank is obtained by compressive stresses in a single pass.

It is a well known fact in the art of metal drawing that a considerably greater elongation is possible without fracture if the material is subjected to compressive stresses at right angles to the elongating tensile stresses, and we have found that unusually great tensile elongations without fracture may be made to take place in a single pass through our extrusion apparatus even for moderate reduction of wall thickness. This is true because the region 24 (Figures 3 and 7) is subjected to such right angle compressive stresses. Furthermore, the forces which we apply are concentrated to a limited geometric volume as said forces scan through the work blank. Consequently, the total forces required are much much lower than would be required by conventional drawing operations for the same reduction.

This will be more fully appreciated by reference to Figure 10, which is an enlarged and somewhat modified view of Figure 3, wherein it is more clearly shown that the geometric extrusion volume 43 is not always bounded on the mandrel side by the mandrel surface but may be localized within the metal of the blank between the bead 15 and the mandrel 5. The metal within the geometric volume 43 may flow plastically, while the region 59 of the metal between said volume 43 and the mandrel 5 is caused to stretch axially in tensile deformation. However, since hydrostatic pressure also exists within the region 59, the tensile elongation characteristics of the metal in this region are greatly enhanced with the result that tensile elongations may be achieved which are greatly in excess of those predictable by ordinary tensile characteristics.

It should not be overlooked that there are two forms of elongation just discussed: (1) where extrusion scanning takes place as described with respect to Figures 7 and 8, producing extremely great thinning and elongation without appreciable tensile elongation; and (2) where enhanced tensile elongation and extrusion scanning are combined as explained with reference to Figure 10.

Although it will be seen that the scanning aperture is loosely a partially bounded portion of the material being worked, the entire periphery thereof is effectively integrated to form a substantially continuous orifice. It will also be noted that the curvature of the work blank where the scanning operation begins (see Figure 7 in particular) is more sloping than the curvature of the edge of the surface adjacent the rollers where the scanning ceases. It is believed the reason for this difference in curvatures will be appreciated from the description contained herein; also, it should be understood that this difference may not be as pronounced as illustrated in the enlarged views of the drawings.

By the nature of our extrusion scanning process, the required driving forces do not increase inordinately for very thin wall extrusions and, therefore, there is practically no limit of the degree of thinning attainable by our extrusion-scanning process. These required driving forces are always transmitted through the thick, unworked portion of the blank since only a single pass over the work is necessary. Of course, it should be understood to be impractical for normal operations to use a work blank initially too thin, because of the likelihood of buckling or wrinkling. This should not be regarded as a limitation on the adaptability of our process for all types of extrusion, but should serve to further distinguish our process from conventional spinning, drawing and axial rolling operations where repeated passes of the work are necessary for accomplishing great reductions in wall thickness.

In practicing our invention, in place of the roller system described above for certain types of work, it is possible to use a roller-like tool 70 (see Figure 11) which does not revolve on its axis. Such a tool has a rounded nose and would simulate a primitive form of tool used in spinning. However, we have found it is preferable that the tool 70 be a roller which turns freely on needle bearings. However, with the simple form of roller 70 shown in Fig. 11, the portion 71 of the work blank 1 axially ahead of the tool is raised up excessively and curled back as the tool advances axially. This is due to lack of the constraining effect on region 43 by the cylindrical shoulder 46 of rollers 11, 12 and 13 previously described.

A similar appearing curled back portion 71 is shown exaggerated in Figure 10, but in this case may be due to excessive compression in region 43 which causes region 43 to extend beyond and ahead of the leading edge of the shoulder 46 of roller 12. This excessive compression is brought about by the fact that tensile forces in region 59 restrict the free flow of material out of extrusion orifice 30. With the relatively great reductions normally used region 59 vanishes as does the above attendant objectionable curl back.

A form of tool construction more satisfactory than those just described is shown in Figure 12. It will be seen that a rod-like member 65 is provided with a rounded nose positioned symmetrically about axis 66, which nose is in forcible contact with work blank 1 to form extrusion aperture 30. Rotation of the tool may be provided if desired in order to replace sliding friction, as in the case of a fixed roller by rolling friction, as exemplified in our roller system, and thus facilitate the extruding processes. A hole 66 may be used if desired to supply high pressure lubricant, and/or coolant to the region near aperture 30.

Further modifications of the rollers will suggest themselves to those skilled in the art, which are considered to come within the scope of the present invention. For example, the nose or head of the tool may be provided with circumferential steps. These steps need not be cylindrical, but may take the form of multiple spirals, with the resulting work having ridges or bumps on its surface.

The backing or mandrel member may take a wide variety of forms, and/or shapes as indicated above. The material for the rollers and backing surfaces should preferably be much harder than the material being formed for obvious reasons. We have found that very hard tool steel suitably ground and polished is satisfactory for cold-working ordinary metals. Further, the use of precision needle bearings are quite satisfactory for the rollers, so as to enable the same to run true.

Figure 5 illustrates a portion of an electron discharge device having a cathode utilizing as a support one embodiment of the present invention. The cathode, designated generally by the reference character 60, is of the unipotential type in the form of a cup-shaped member 61 of suitable base material which is indirectly heated by a heater 62. The cathode member 61 is joined to a support 63, which is one end product of our novel process, and which in turn is mounted upon a supporting base 64 which latter may be sealed into a glass member 67. It is obvious to those skilled in the art that the intermediate thin walled portion of the support 63 functions as a heat isolating means for the cathode 60. This construction is a feature of a co-pending application filed by us May 12, 1948, Serial Number 26,696, relating to a novel Vacuum Tube Construction.

It will be appreciated that by our method of extrusion scanning, the scanning path per se may take other forms. In a form of scanning which is particularly applicable in making articles of cone-shape by the present process, the scanning path takes the form of a flat spiral, with the roller or other scanning tool progressing radially outwardly on a rotating flat work blank.

As is apparent from the foregoing description, our process is conservative in volume of material, and the inside diameter of the work blank may be retained uniform throughout.

It should be understood that it is not necessary that the rollers, if designed to rotate, be driven by friction from the work, but external driving means may be provided to rotate the rollers with or relative to the work being extruded.

Any suitable ductile material may be successfully used with our process, including those metals which are subject to brittle work hardening under severe cold working. We have used copper, nickel, iron, tantalum, molybdenum, and various alloys, such as "Kovar" and chrome-irons as the blank material. Other metals may, of course, be used, as well as those plastics or other materials which can be plastically deformed.

While the process as described utilizes round tubular sections over a smooth round mandrel and with external rollers, as an example, it is to be understood that this invention includes the adaptation where one or more rollers are mounted on the inside of the tubular work piece and the backing surface consists of the inside wall of a hard cylinder surrounding the work piece.

Various other modifications of the invention may be made in its application to various types of devices but the ones described and/or suggested may be regarded as illustrative of the scope of the invention which is only limited by the prior art and appended claims.

What is claimed is:

1. As an article of manufacture, a one piece tube of ductile conducting material having a relatively thick portion and an extremely thin elongated portion functioning as heat isolating means for said thick portion, said first-mentioned portion being from 10 to several hundred times as thick as said elongated portion and the latter between .0003 and .005 inch thick.

2. A cathode support member formed of a hollow cylindrical one piece body, having relatively thick end portions and an intermediate extremely thin elongated portion of substantially less external diameter than that of the end portions, said end portions being from ten to several hundred times as thick as said intermediate portion, said thin portion functioning as heat isolating means between said thick portions.

3. A part for an electron discharge device, comprising an integral one piece tubular body having a plurality of sections, one of said sections being relatively thick and another of said sections being elongated, extremely thin and foil-like and functioning as a heat isolating means for said thick section, said elongated section being between .0003 and .005 inch thick.

LLOYD P. GARNER.
WILLIAM N. PARKER.

REFERENCES CITED

The following references are of record in the file of this patent:

UNITED STATES PATENTS

| Number | Name | Date |
| --- | --- | --- |
| 11,009 | Pratt | June 6, 1854 |
| 507,572 | Walsh | Oct. 31, 1893 |
| 691,540 | Gieshoidt | Jan. 21, 1902 |
| 1,199,080 | Jones | Sept. 26, 1916 |
| 1,596,751 | Millspaugh | Aug. 17, 1926 |
| 2,442,662 | Peterson | June 1, 1948 |

FOREIGN PATENTS

| Number | Country | Date |
| --- | --- | --- |
| 468,918 | France | July 20, 1914 |